United States Patent
Li et al.

(10) Patent No.: US 9,495,334 B2
(45) Date of Patent: Nov. 15, 2016

(54) VISUALIZING CONTENT REFERENCED IN AN ELECTRONIC DOCUMENT

(75) Inventors: Baichao Li, Beijing (CN); Chenglong Ao, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 643 days.

(21) Appl. No.: 13/363,643

(22) Filed: Feb. 1, 2012

(65) Prior Publication Data
US 2014/0040734 A1 Feb. 6, 2014

(51) Int. Cl.
G06F 17/00 (2006.01)
G06F 17/21 (2006.01)
G06F 17/24 (2006.01)

(52) U.S. Cl.
CPC .......... *G06F 17/215* (2013.01); *G06F 17/212* (2013.01); *G06F 17/241* (2013.01)

(58) Field of Classification Search
CPC ........................... G06F 17/2121; G06F 17/241
USPC ...................................................... 715/273
See application file for complete search history.

(56) References Cited

U.S. PATENT DOCUMENTS

| | | | | |
|---|---|---|---|---|
| 5,905,980 A * | 5/1999 | Masuichi | .......... | G06F 17/30616 707/700 |
| 6,801,907 B1 * | 10/2004 | Zagami | ...................... | G07C 1/10 |
| 7,047,502 B2 | 5/2006 | Petropoulos et al. | | |
| 7,231,602 B1 | 6/2007 | Truelove et al. | | |
| 7,895,531 B2 | 2/2011 | Radtke et al. | | |
| 8,423,886 B2 * | 4/2013 | Barrie | ................... | G06F 17/241 715/230 |
| 2001/0042083 A1 * | 11/2001 | Saito | ................. | G06F 17/30253 715/202 |
| 2004/0024775 A1 * | 2/2004 | Kemp | .................... | G06Q 10/10 |
| 2005/0182794 A1 * | 8/2005 | Masui | ................... | G06F 17/276 |
| 2006/0104511 A1 * | 5/2006 | Guo | .................... | G06K 9/00469 382/176 |
| 2006/0285152 A1 | 12/2006 | Skillen | | |
| 2007/0100874 A1 * | 5/2007 | Balinsky | ............... | G06F 17/212 |
| 2008/0002864 A1 * | 1/2008 | Das | .................... | G06K 9/00664 382/118 |
| 2008/0059452 A1 * | 3/2008 | Frank | .................... | G06F 3/0481 |
| 2008/0222570 A1 * | 9/2008 | MacLaurin | ....... | G06F 17/30554 715/839 |
| 2009/0292686 A1 * | 11/2009 | Carter | ............... | G06F 17/30731 |
| 2010/0107123 A1 | 4/2010 | Sareen et al. | | |
| 2010/0174606 A1 * | 7/2010 | Hoyle | ......................... | 705/14.52 |
| 2010/0290699 A1 * | 11/2010 | Adam | ............... | G06F 17/30244 382/155 |
| 2010/0306249 A1 * | 12/2010 | Hill | .................. | G06F 17/30867 707/769 |
| 2011/0066957 A1 * | 3/2011 | Prats et al. | .................... | 715/753 |
| 2012/0233539 A1 * | 9/2012 | Reed | ............................ | 715/234 |

(Continued)

*Primary Examiner* — Laurie Ries
(74) *Attorney, Agent, or Firm* — Shook, Hardy & Bacon L.L.P.

(57) ABSTRACT

Method and system for visualizing content referenced in an electronic document are provided. Example system includes an access module, a reference detector, and a float window loader. The access module can open electronic documents. An electronic document may include descriptive textual content and one or more illustrative objects. The reference detector detects that a cursor is positioned over text in the descriptive content that refers to an illustrative object. In response, the float window loader presents the illustrative object in a float window.

18 Claims, 6 Drawing Sheets

(56) References Cited

U.S. PATENT DOCUMENTS

| | | | |
|---|---|---|---|
| 2013/0013990 A1* | 1/2013 | Green et al. | 715/205 |
| 2013/0142418 A1* | 6/2013 | van Zwol | G06K 9/00751 382/159 |
| 2014/0089789 A1* | 3/2014 | Schowtka | G06F 17/248 715/243 |

* cited by examiner

VISUALIZING CONTENT REFERENCED IN AN ELECTRONIC DOCUMENT

TECHNICAL FIELD

This disclosure relates generally to the technical fields of software and/or hardware technology and, in one example embodiment, to system and method for visualizing content referenced in an electronic document.

BACKGROUND

Many documents are generated in today's electronic society. An electronic document can include an object that provides an illustration or a visualization of a portion of the text in the document. For example, a United States patent document often has one or more drawings that appear close to the beginning of the document, while references to these drawing appear throughout the written description of the patent. For example, a document may have a figure titled "FIG. 1A" on page 2 of the document, which is referenced on page 12 of the document (e.g., page 12 of the document may include the text "FIG. 1A is a diagram illustrating . . ."). When a user is reading the text on page 12 that references FIG. 1A, he might not remember all the details of FIG. 1A and may need to go back to page 2 to get the detailed information, and then return back to page 12. This may be very inconvenient and distracting from the flow of ideas. Existing viewing applications lack functionality that provides a convenient method to link a table or a figure in an electronic document to the text that is referring to such illustrative object.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
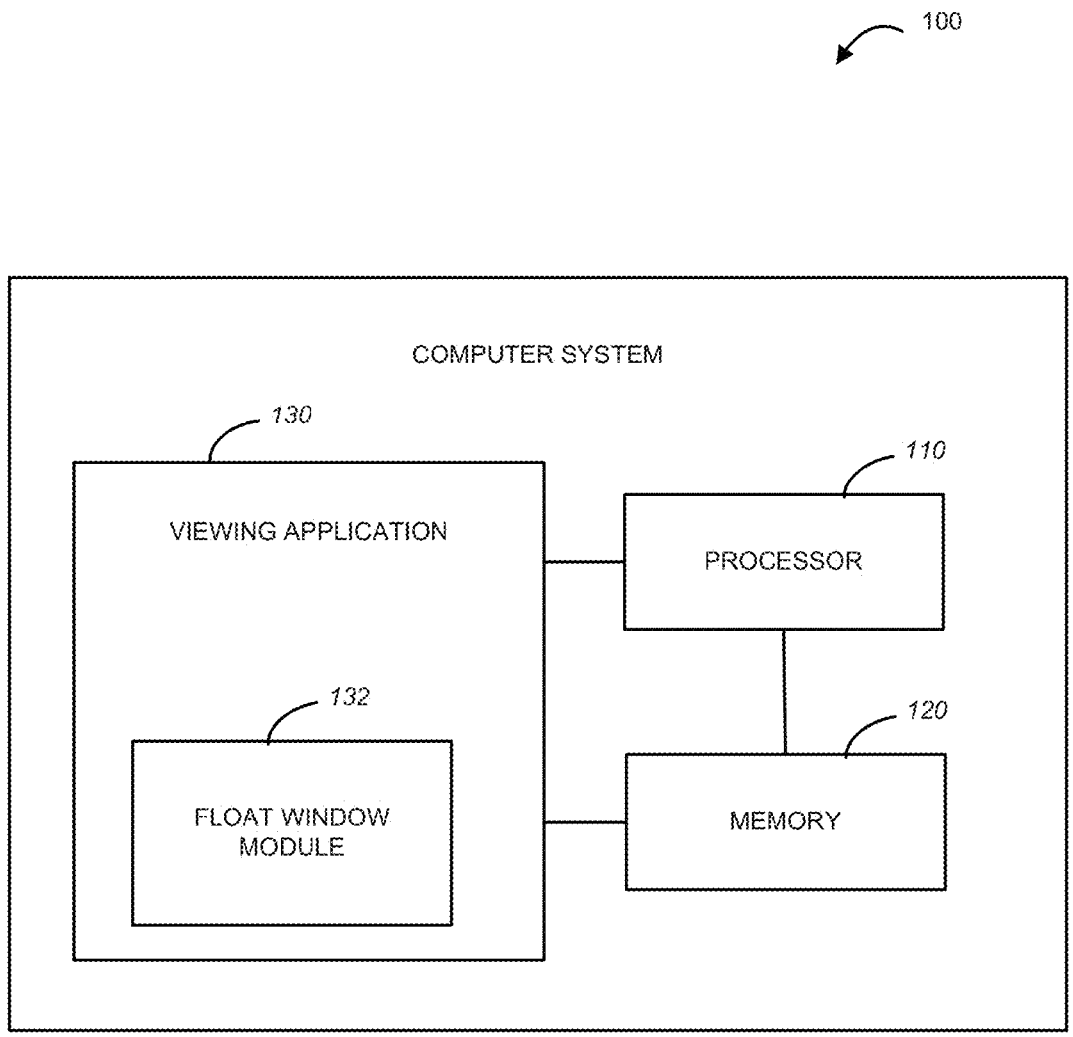
FIG. 1 shows a diagram of an architecture within which a method and system for visualizing content referenced in an electronic document is implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, a "document" or "an electronic document" refers to electronic media content that is accessible by computer technology. For example, a document can be a file that is not an executable file or a system file and includes data for use by a computer program. An example of a document includes a single or multiple files that are accessible by and/or associated with electronic document processing applications such as word processing applications, document viewers, email applications, presentation applications, spreadsheet applications, diagramming applications, graphic editors, graphic viewers, enterprise applications, and other applications. Therefore, as explained in more detail below, a document may be composed of alphanumeric texts, symbols, images, videos, sounds, and other data. It should be appreciated that a document can have a variety of file formats that, for example, may be identified by data within a document and/or by the filename extension. Examples of file formats that may be associated with a document include Adobe Portable Document Format (PDF), Microsoft DOC format, Hypertext Markup Language (HTML) format, Extensible Markup Language (XML) format, Microsoft XLS format, Tag Image File Format (TIFF), Rich TextFormat (RTF), and Report File Format (RPT).

Method and system are described that facilitate visualizing content referenced in an electronic document. In one embodiment, the system is configured to allow a user to access an illustrative object (e.g., a table or a drawing) that is present in an electronic document from a location where the document text is referring to that illustrative object. Example method and system described herein utilize a float window feature with an illustrative object referenced in the text when a user positions the cursor over the text that references that object. In one embodiment, when the cursor is moved away from the referencing text, the float window is removed from the display screen. The method and system described herein may be utilized, beneficially with personal computer devices including desktop computers, laptop computers, and devices with smaller screen size, e.g., touch pads or smart phones.

Figure 2:
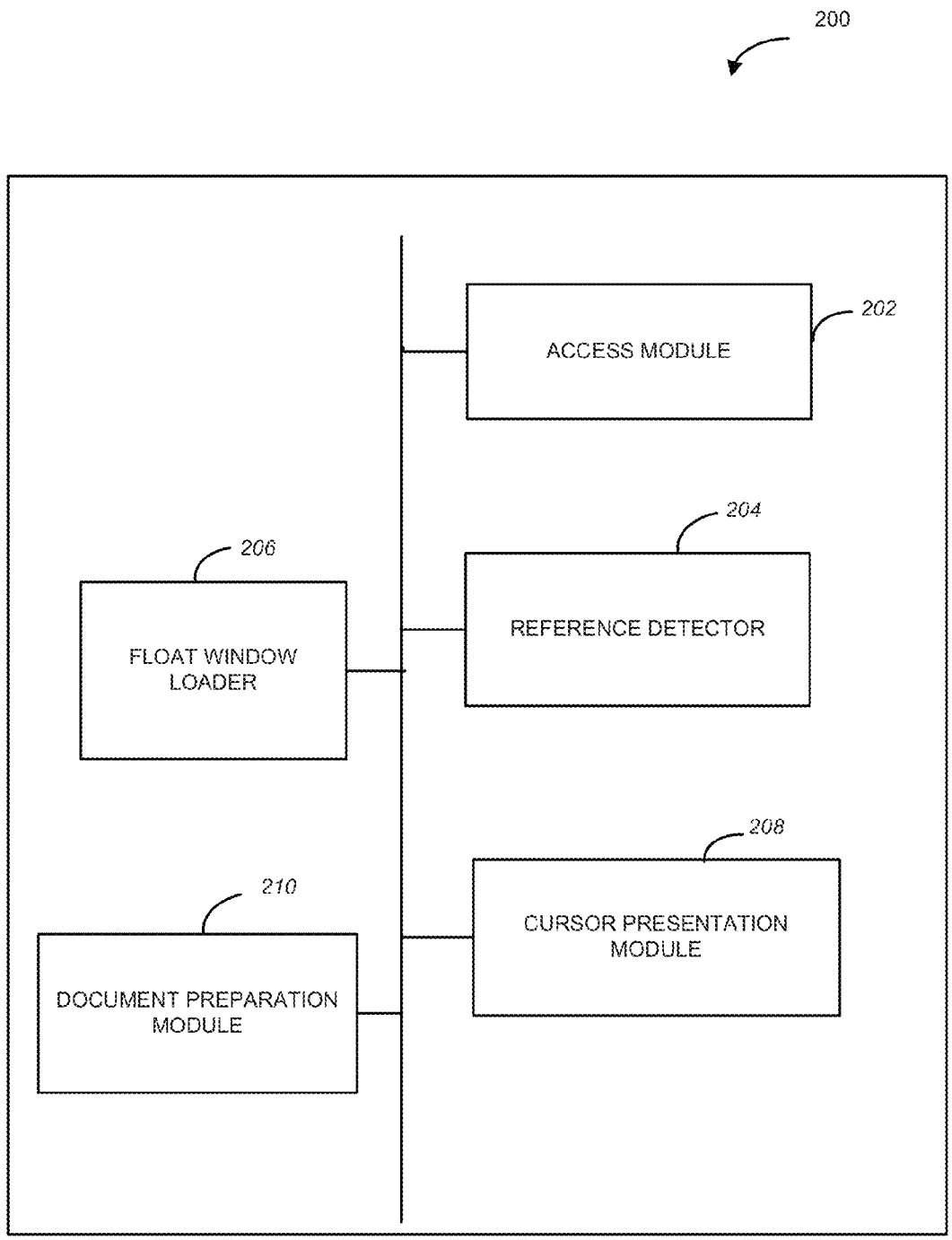
FIG. 2 is a block diagram illustrating a system for visualizing content referenced in an electronic document, in accordance with an example embodiment.

FIG. 1 shows a diagram of a computer system 100 that may be used to provide method and system for visualizing content referenced in an electronic document may be implemented, in accordance with an example embodiment. The computer system 100 comprises one or more processors including a processor 110 coupled to a memory 120 and a viewing application 130. The viewing application 130 includes a float window nodule 132. The float window module may be implemented as a module that is part of the viewing application 130 or as a plug-in that can be utilized with the viewing application 132. The float window module 132, in one example embodiment, is configured to allow a user to access an illustrative object that is present in an electronic document from a location where the document text is referring to that illustrative object. FIG. 2 is a block diagram illustrating a system for visualizing content referenced in an electronic document, e.g., implemented as the floating window module 132.

FIG. 2 is a block diagram illustrating a system 200 for visualizing content referenced in an electronic document. In one example embodiment, the system 200 for visualizing content referenced in an electronic document may be associated with a viewing application and may correspond to the floating window module 132 of FIG. 1. Each of the modules of the system 200 may be implemented utilizing at least one processor.

Figure 5:
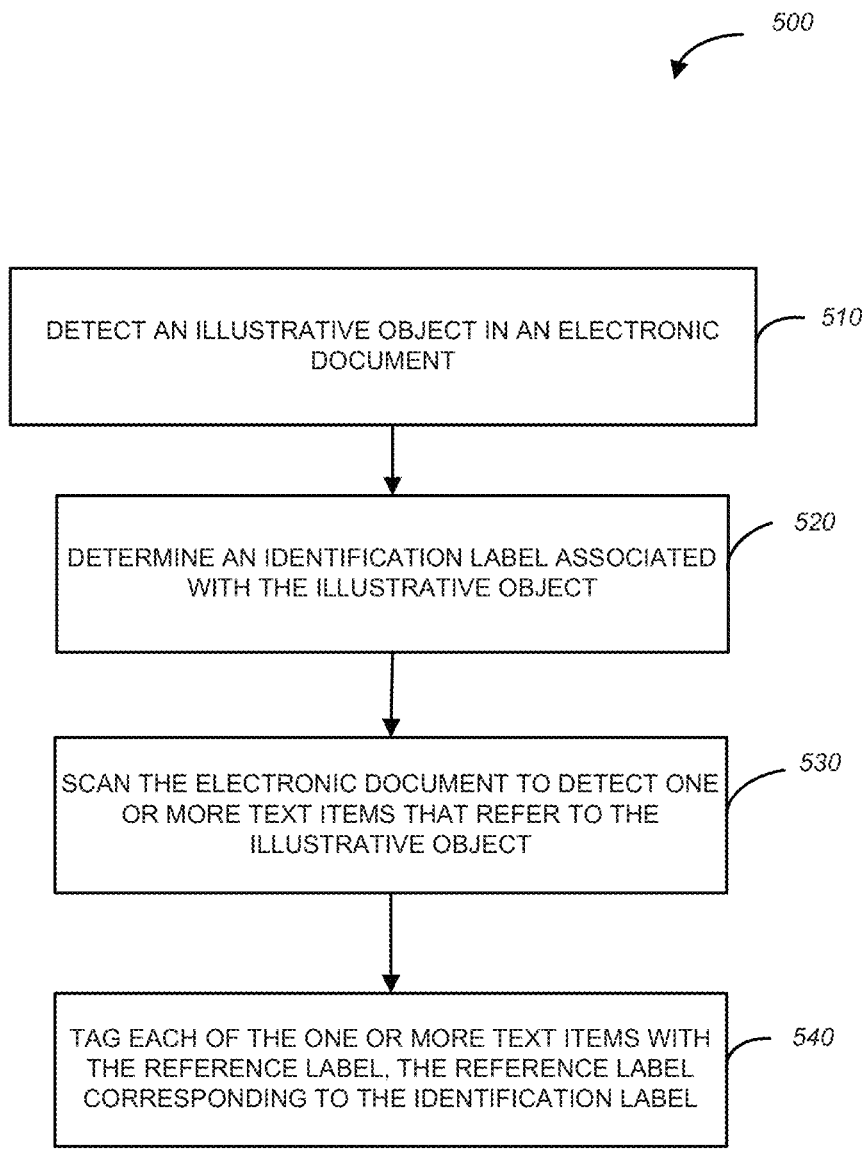
FIG. 5 is a flow chart illustrating a method for preparing an electronic document, in accordance with an example embodiment.

As shown in FIG. 2, the system 200 includes an access module 202, a reference detector 204, and a float window loader 206. The access module 202 may be configured to open electronic documents. As mentioned above, an electronic document may include descriptive textual content, as well as illustrative objects, such as, e.g., tables and drawings (or figures). An illustrative object may be identified by a label, e.g., "Table 1" if the illustrative object is a table, or "FIG. 1," if the illustrative object is a drawing. The reference detector 204 may be configured to detect that a cursor, controlled by a user, is positioned over text in the descriptive content that refers to the illustrative object (e.g., over a label "Table 1" or "FIG. 1"). The reference detector 204 cooperates with the float window loader 206, which is configured to respond to detecting the cursor being positioned over text in the descriptive content referring to the illustrative object by loading the associated illustrative object into memory and rendering the illustrative object in a float window. The float window may be presented in a display area of the document viewing application, e.g., as shown in FIG. 5, which is described further below. The reference detector 204 may also cooperate with a cursor presentation module 208. The cursor presentation module 208, shown in FIG. 2, may be configured to present change the shape of the cursor the cursor being positioned over text in the descriptive content referring to the illustrative object. For example, the cursor presentation module 208 may present a cursor as a shape indicating availability of the float window functionality.

In one example embodiment, the reference detector 204 detects that a cursor is positioned over text referring to an illustrative object by recognizing that certain text is tagged with a reference label. The reference detector 204 may be configured to identify text tagged with a reference label as referring to the associated illustrative object. The tagging of text (an alpha-numeric string) may be performed by a document preparation module 210 shown in FIG. 2. In one embodiment, the document preparation module 210 may be configured to detect an illustrative object in an electronic document, determine an identification label associated with the illustrative object, scan the electronic document to detect one or more text items that refer to the illustrative object, and tag each of these text items with a reference label that corresponds to the identification label. As mentioned above, a document may be provided in a variety of formats, including Adobe® Portable Document Format (PDF).

The system 200, as shown in FIG. 2, comprises a plurality of components (or modules), some of which may be implemented as part of a viewing application (e.g., the viewing application 130 of FIG. 1), while others may be implemented as either part of the viewing application or as part of a plug-in that cooperates with and functions in conjunction with the viewing application. For example, the access module 202 may be provided as part of a document viewing application, while the reference detector 204, the float window loader 206, the cursor presentation module 208, and the document preparation module 210 may provided as part of a plug-in associated with the document viewing application. Example operations performed by the system 200 for visualizing content referenced in an electronic document are described with reference to FIG. 3.

Figure 3:
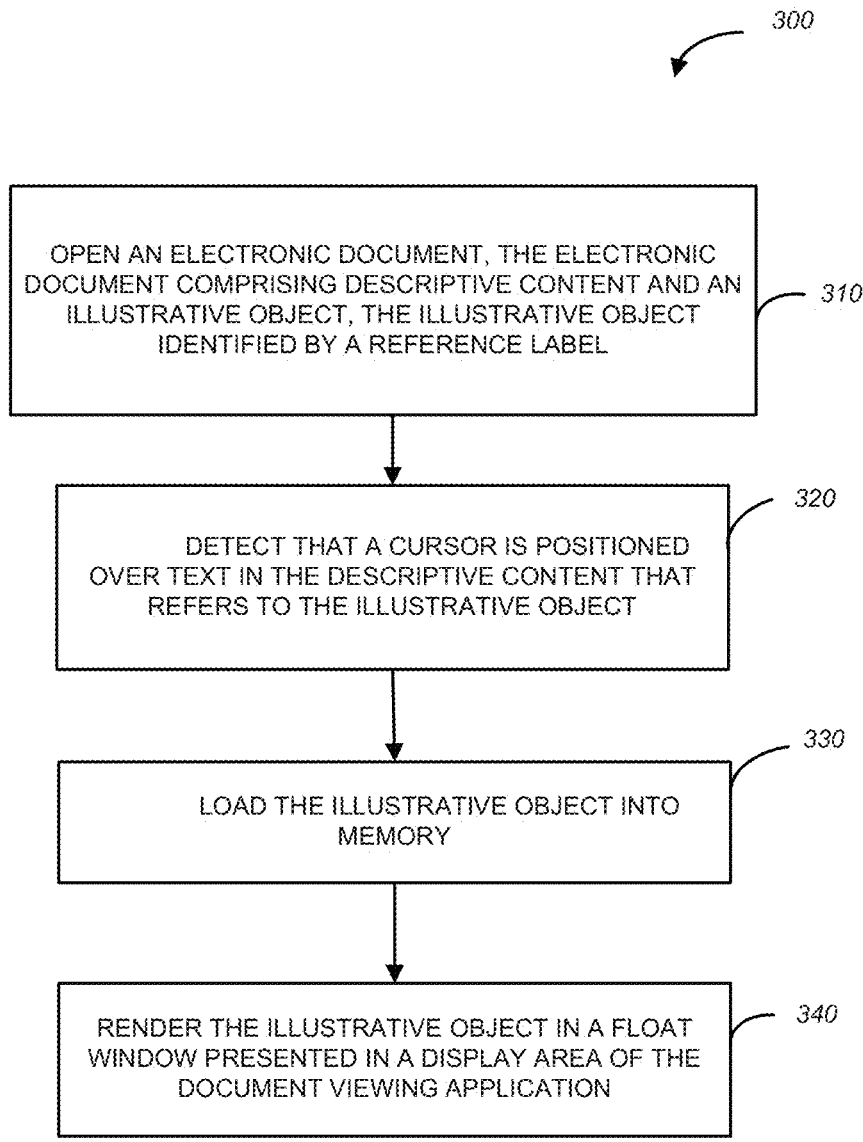
FIG. 3 is a flow chart illustrating a method for visualizing content referenced in an electronic document, in accordance with an example embodiment.

FIG. 3 is a flow chart illustrating a method 300 for visualizing content referenced in an electronic document, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the computer system 100 of FIG. 1 and, specifically, at the system 200 shown in FIG. 2.

As shown in FIG. 3, the method 300 commences at operation 310 when the access module 202 of FIG. 2 opens electronic documents. In one embodiment, the electronic document includes descriptive textual content, as well as illustrative objects, such as, e.g., tables and drawings (or figures). At operation 320, the reference detector 204 of FIG. 2 detects that a cursor is positioned over text in the descriptive content that refers to the illustrative object (e.g., over a label "Table 1" or "FIG. 1"). While an illustrative object may be self contained in that it has all context needed for its rendering, in some embodiments the context associated with the main window (e.g., settings such as color, font, etc.) is collected before the illustrative object is rendered in a float window.

At operation 330, the float window loader 206 of FIG. 2 responds to the reference detector 204 detecting the cursor being positioned over text in the descriptive content referring to the illustrative object by loading the associated illustrative object into memory. At operation 340, the float window loader 206 renders the illustrative object in a float window. The float window may be presented in a display area of the document viewing application, e.g., as shown in FIG. 4.

Figure 4:
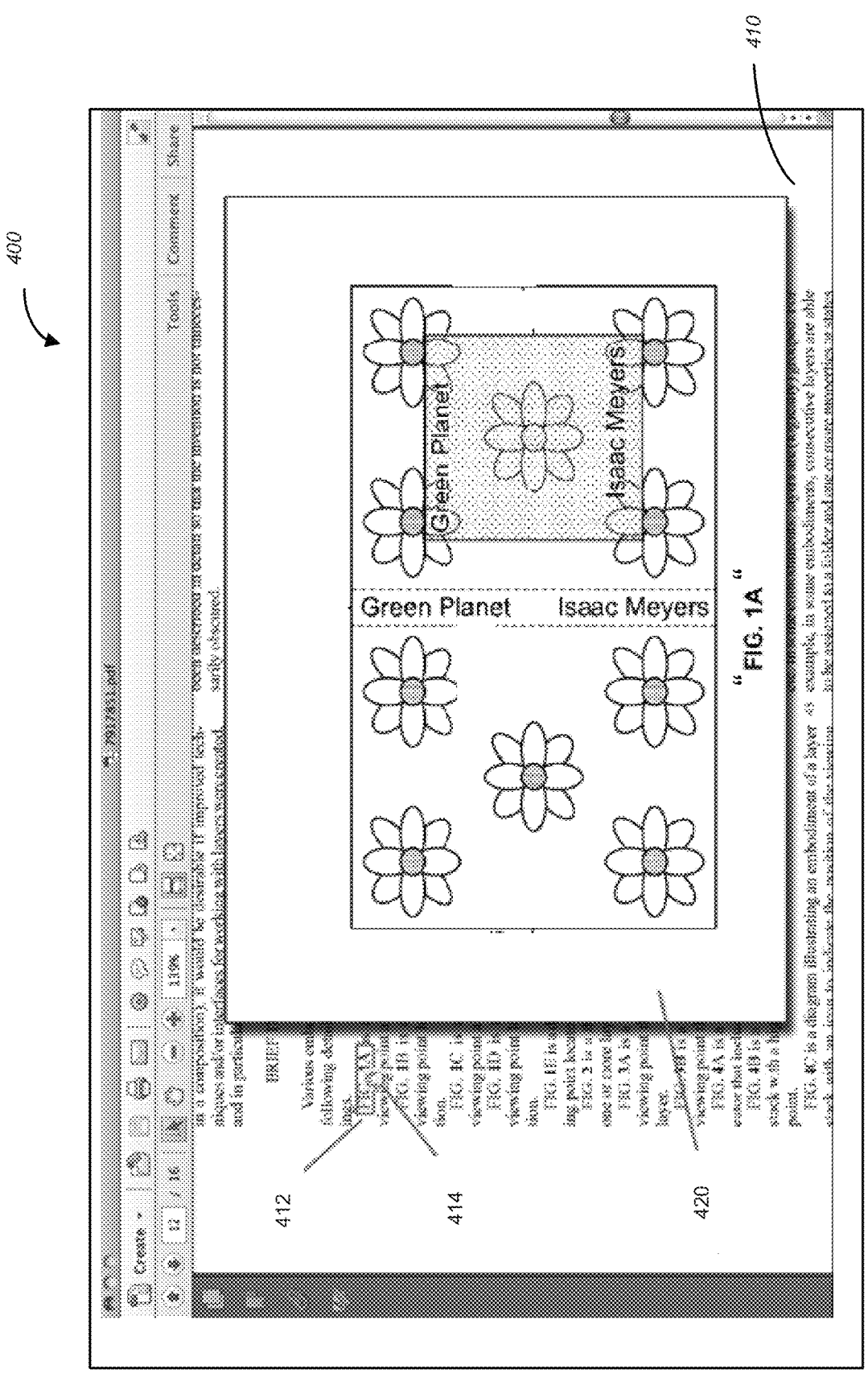
FIG. 4 is an example user interface illustrating visualizing content referenced in an electronic document, in accordance with an example embodiment.

FIG. 4 is an example user interface 400 illustrating visualizing content referenced in an electronic document, in accordance with an example embodiment. Shown in FIG. 4 is a display area of a document viewing application 410. Displayed in the display area 410 is a portion of an electronic document that includes textual references to drawings, in the form of alpha-numeric strings that read "FIG. 1A," "FIG. 1B," "FIG. 1C," etc. The text that reads strings that read "FIG. 1A" is identified with reference numeral 412. Shown in FIG. 4 is a cursor 414 positioned over the text 412. The shape of the cursor indicates that float window functionality is available with respect to the text 412. In one example embodiment, the float window functionality may be invoked by clicking on the text 412. In response, a float window 420 is presented, displaying the drawing (FIG. 1A) referenced by the text 412.

FIG. 5 is a flow chart illustrating a method 500 for preparing an electronic document, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the computer system 100 of FIG. 1 and, specifically, at the system 200 shown in FIG. 2.

As shown in FIG. 5, the method 500 commences at operation 510 when the document preparation module 210 of FIG. 2 detects an illustrative object in an electronic document. As mentioned above, the electronic document may include descriptive textual content, as well as illustrative objects, such as, e.g., tables and drawings (or figures). An illustrative object has an identification label. For example, an identification label for a drawing may be "FIG. 1." An identification label for a table may be "Table 1."

At operation 520, the document preparation module 210 determines an identification label associated with the illustrative object. At operation 530, the document preparation module 210 scans the electronic document to detect whether there are any text items that refer to the illustrative object. At operation 540, the document preparation module 210 tags each of these detected text items with a reference label that corresponds to the identification label. the document preparation module 210 As described above, a tag may be used by the reference detector 204 of FIG. 2 to detect that certain text in the descriptive content in an electronic document refers to a particular illustrative object and that a cursor is positioned over text in the descriptive content that refers to the illustrative object.

The document preparation module 210 also adds a link to the associated illustrative object such that the text that refers to the illustrative object can function as a control that can be activated and cause the launching of a float window displaying the illustrative object.

In one example embodiment, a viewing application, also termed an electronic document reader, may be provided with a default configuration that comprises regular expressions for use in matching tagged text in an electronic document. For example, assuming that the tagged text in electronic documents includes strings such as "Figure," "Fig," "Table," and "Chart," a viewing application default configuration may include regular expressions shown in Table 1 below.

TABLE 1

'Figure(.{0,5})([0-9]+)(.{0,1})([0-9]*)'
'Fig(.{0,5})([0-9]+)(.{0,1})([0-9]*)'
'Table(.{0,5})([0-9]+)(.{0,1})([0-9]*)'
'Chart(.{0,5})([0-9]+)(.{0,1})([0-9]*)'

For example, in order to locate and tag a table labeled "Table 2.1 Different Formats Used by Microsoft in the Past 10 Years," a script shown in Table 2 below may be utilized.

TABLE 2 import re
m = re.search ('Table(.{0,5})([0-9]+)(.{0,1})([0-9]*)', 'Table 2.1 Different Formats Used by Microsoft in the Past 10 Years', re.IGNORECASE)
if m is None :
    print "\nnone matched!"
else:
    print ("\n%s" % m.group(0))

A viewing application may then execute commands linking the tagged text "Table 2.1" to the corresponding table object in the electronic document.

A viewing application may also be provided with a configuration GUI to let a user add their own custom regular expressions to the default configuration, such as, e.g., a regular expression for tagging a string that starts with the word "Formula." An example of a formula and an associated text is shown in Table 3 below.

TABLE 3

The finial formula 3.2.5 is, $$L = \log_2\left(\max\left(\sqrt{\left(\frac{\partial u_{texel}}{\partial x_s}\right)^2 + \left(\frac{\partial v_{texel}}{\partial x_s}\right)^2}, \sqrt{\left(\frac{\partial u_{texel}}{\partial y_s}\right)^2 + \left(\frac{\partial v_{texel}}{\partial y_s}\right)^2}\right)\right)$$

$$= \log_2\left(\sqrt{\max\left(\left(\frac{\partial u_{texel}}{\partial x_s}\right)^2 + \left(\frac{\partial v_{texel}}{\partial x_s}\right)^2, \left(\frac{\partial u_{texel}}{\partial y_s}\right)^2 + \left(\frac{\partial v_{texel}}{\partial y_s}\right)^2\right)}\right)$$

$$= \frac{1}{2}\log_2\left(\max\left(\left(\frac{\partial u_{texel}}{\partial x_s}\right)^2 + \left(\frac{\partial v_{texel}}{\partial x_s}\right)^2, \left(\frac{\partial u_{texel}}{\partial y_s}\right)^2 + \left(\frac{\partial v_{texel}}{\partial y_s}\right)^2\right)\right)$$

In this scenario, a user can use configuration GUI to add his own regular expression 'Formula(.{0,5})([0-9]+)(.{0,1})([0-9]*)' to get all formula photos and tagged text tracked.

EXAMPLE IMPLEMENTATION

Example system and method for visualizing content referenced in an electronic document may be implemented as described below.

A viewing application configuration may include two lists: one list being a list of regular expressions for various formats of tagged text of illustrative objects (e.g., tables, charts, formulas, figures, etc.), the other list being a so-called priority list that includes respective expected positions of the tagged text in an electronic document. An example of these two lists is shown in Table 4 below.

TABLE 4

Tagged Text:
    'Figure(.{0,5})([0-9]+)(.{0,1})([0-9]*)'
    'Fig(.{0,5})([0-9]+)(.{0,1})([0-9]*)'
    'Table(.{0,5})([0-9]+)(.{0,1})([0-9]*)'

TABLE 4-continued

'Chart(.{0,5})([0-9]+)(.{0,1})([0-9]*)'
Position Priority:
    Priority 1: 'The first line of text just below the illustrative object'
    Priority 2: 'The first line of text just above the illustrative object'

In one embodiment, a viewing application records and stores tagged text, an associated illustrative object, and the context associated with the illustrative object in a designated container. Such container (called "Manager" in the example shown in Table 4 below) may include a list of structures (structures called "ManagedItem" in the example shown in Table 5 below), where each "ManagedItem" structure has elements such as tagged text, illustrative object id, and illustrative object context.

TABLE 5

ManagedItem {
    Illustrative Object ID,
    Illustrative Object Context ,
    Tagged Text}
Manager = List < ManagedItems>

An example algorithm for finding a tagged text in an electronic document is shown below in Table 6.

TABLE 6

Read configuration list of tagged text regular expression
Read configuration list of text position priority
Initialize "Manager",
Scan Document,
Loop1: get next illustrative object (table / figure)
    Created a new "ManagedItem",
    Set illustrative object ID of that "ManagedItem"
Collect "Context" of that illustrative object, set it to "Context" of that "ManagedItem"
    Loop2: iterator priority position rule to get corresponding text around that illustrative object.
        Loop3: iterator matching conditions to get matched tagged text
            If get matched tagged text ,
                Set matched tagged text to "tagged text" of that ManagedItem
                Exit loop3: matching conditions
                Exit loop2: priority positions
        End Loop3
    End Loop2
    If ManagedItem's tagged text has a valid value
        Put ManagedItem in to Manager.
    Else (note: after Loop2 × Loop3, there is no matched tagged text found)
        Illustrative has no match tagged text, skip it.
End Loop1

An example algorithm for redrawing referenced tagged text is shown below in Table 7.

TABLE 7

Loop1: Iterate "ManagedItem" in "Manager",
    Get tagged text
    Scan all text in the document and search tagged text
    While: find one
        Redraw it as hotlinked Tagged Text
        Link it to related ManagedItem
    End While
End Loop1

An example algorithm for displaying illustrative objects is shown below in Table 8.

TABLE 8

Figure 6:
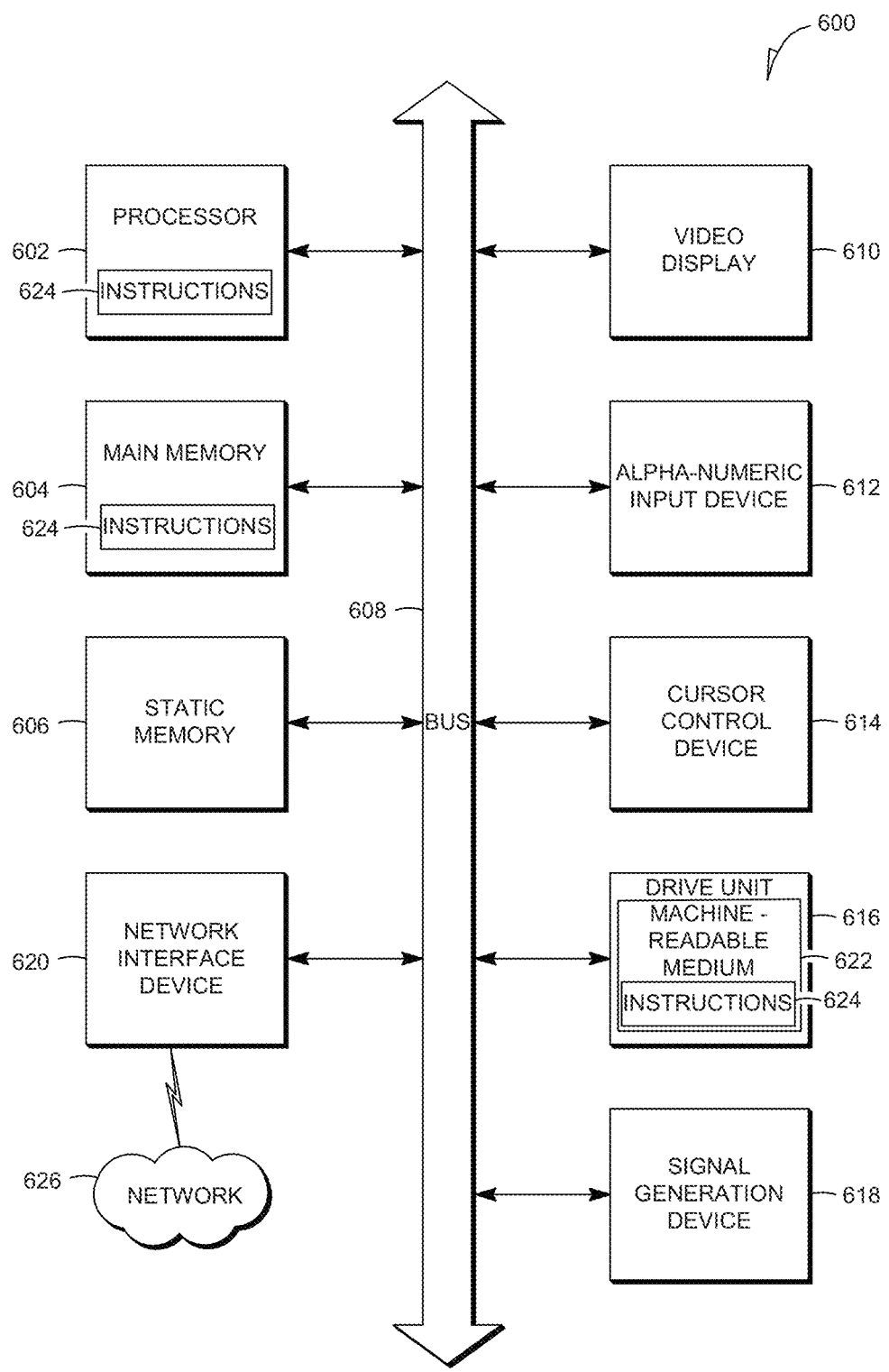
FIG. 6 illustrates a diagrammatic representation of a machine in the example form of a computer system within which a set of instructions, for causing the machine to perform any one or more of the methodologies illustrated in accordance with FIG. 1-5 related to visualizing content referenced in an electronic document may be executed.

When the cursor moves over the tagged and linked text
    If its FloatWindow showing
        Skip
    Else
        Get its ManagedItem,
        Get illustrative object ID
        Get its illustrative object display context
        Create a float window
        Load illustrative object
        Draw illustrative object with its display context.
When the cursor moves out of the tagged and linked text
    If FloatWindow showing
        Destroy the illustrative object
        Destroy the float window
    Else
        Skip FIG. 6 shows a diagrammatic representation of a machine in the example form of a computer system 600 within which a set of instructions, for causing the machine to perform any one or more of the methodologies related to visualizing content referenced in an electronic document may be executed, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 607. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, method and system for visualizing content referenced in an electronic document have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method comprising:
   opening, by a document viewing application, an electronic document, the electronic document comprising descriptive content and an illustrative object, the illustrative object identified by a reference label, wherein a document preparation module and a reference detector cooperate with and function in conjunction with the document viewing application to:
   (1) automatically detect the illustrative object in the electronic document, determine an identification label associated with the illustrative object, scan the electronic document to detect one or more text items that refer to the illustrative object, and tag each of the one or more text items with a reference label corresponding to the identification label;
   (2) automatically detect that a cursor is positioned over the one or more text items in the descriptive content that is tagged with the reference label; and
   responding to the detecting, using at least one processor coupled to a memory, by loading the illustrative object into memory and rendering the illustrative object in a float window, the float window being presented in a display area of the viewing application.

2. The method of claim 1, wherein the illustrative object is a figure.

3. The method of claim 1, wherein the illustrative object is a table.

4. The method of claim 1, wherein the illustrative object and the reference to the illustrative object are located on different pages of the electronic document.

5. The method of claim 1, comprising:
   detecting that the text is tagged with the reference label; and
   identifying the text as referring to the illustrative object.

6. The method of claim 1, comprising:
   presenting the cursor as a first shape; and
   responding to the detecting comprises displaying the cursor as a second shape, the second shape indicating availability of a float window functionality.

7. The method of claim 1, wherein the responding to the detecting by loading the illustrative object into memory and rendering the illustrative object in a float window is by a plug-in associated with the document viewing application.

8. The method of claim 1, wherein the rendering of the illustrative object in a float window is in response to a click action.

9. The method of claim 1, wherein the electronic document is in a Portable Document Format.

10. A computer-implemented system comprising:
    at least one processor coupled to a memory;
    an access module to open an electronic document, the electronic document comprising descriptive content and an illustrative object, the illustrative object identified by a reference label;
    a document preparation model to automatically detect the illustrative object in the electronic document, determine an identification label associated with the illustrative object, scan the electronic document to detect one or more text items that refer to the illustrative object and, tag each of the one or more text items with a reference label corresponding to the identification label;
    a reference detector to automatically detect that a cursor is positioned over text in the descriptive content that is tagged with the reference label; and
    a float window loader to respond to the detecting by loading the illustrative object into memory and rendering the illustrative object in a float window, the float window being presented in a display area of the document viewing application.

11. The system of claim 10, wherein the illustrative object is a figure.

12. The system of claim 10, wherein the illustrative object is a table.

13. The system of claim 10, wherein the illustrative object and the reference to the illustrative object are located on different pages of the electronic document.

14. The system of claim 10, wherein the reference detector is to:
    detect that the text is tagged with the reference label; and
    identify the text as referring to the illustrative object.

15. The system of claim 10 comprising a cursor presentation module to:
    present the cursor as a first shape; and
    display the cursor as a second shape, the second shape indicating availability of a float window functionality.

16. The system of claim 10, wherein:
    the access module is provided as part of a document viewing application; and
    the float window module is provided as part of a plug-in associated with the document viewing application.

17. The system of claim 10, wherein the electronic document is in a Portable Document Format.

18. A machine-readable non-transitory storage medium having instruction data to cause a machine to:

open an electronic document, the electronic document comprising descriptive content and an illustrative object, the illustrative object identified by a reference label;

automatically detect, by a document preparation module, the illustrative object in the electronic document;

automatically determine, by the document preparation module, an identification label associated with the illustrative object;

automatically scan, by the document preparation, the electronic document to detect one or more text items that refer to the illustrative object;

automatically tag, by the document preparation module, each of the one or more text items with a reference label corresponding to the identification label;

automatically detect, by a reference detector, that a cursor is positioned over text in the descriptive content that is tagged with the reference label; and responding, utilizing a float window loader, to the detecting by loading the illustrative object into memory and rendering the illustrative object in a float window, the float window being presented in a display area of the document viewing application.

* * * * *